United States Patent
Saleh et al.

(10) Patent No.: US 12,176,715 B2
(45) Date of Patent: Dec. 24, 2024

(54) USE OF SYNCHRONOUS MOTORS TO CONTROL POWER MANAGEMENT SYSTEM

(71) Applicant: SAUDI ARABIAN OIL COMPANY, Dhahran (SA)

(72) Inventors: Yaseen Saleh, Dhahran (SA); Wasseem Ali Khardawi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 42 days.

(21) Appl. No.: 18/188,086

(22) Filed: Mar. 22, 2023

(65) Prior Publication Data
US 2024/0322568 A1  Sep. 26, 2024

(51) Int. Cl.
*H02J 3/22* (2006.01)
*H02J 3/38* (2006.01)
*H02J 13/00* (2006.01)

(52) U.S. Cl.
CPC .............. *H02J 3/22* (2013.01); *H02J 3/381* (2013.01); *H02J 13/00002* (2020.01)

(58) Field of Classification Search
CPC ......... H02J 3/22; H02J 13/00002; H02J 3/381
USPC .......................................................... 307/43
See application file for complete search history.

(56) References Cited

U.S. PATENT DOCUMENTS

| | | | |
|---|---|---|---|
| 8,451,573 B1* | 5/2013 | Klumper | H02H 9/04 361/91.1 |
| 11,394,203 B2 | 7/2022 | Alkhardawi | |
| 2010/0133826 A1* | 6/2010 | Santiago | F03D 9/255 290/55 |
| 2012/0101643 A1* | 4/2012 | Kirchner | F03D 9/255 700/287 |
| 2012/0139344 A1* | 6/2012 | Langel | F03D 7/048 307/64 |
| 2013/0307271 A1* | 11/2013 | Langel | H02J 3/42 290/55 |
| 2015/0108952 A1* | 4/2015 | Moeller | H02J 3/1821 323/205 |
| 2020/0370537 A1* | 11/2020 | Hospers | F03D 9/257 |

\* cited by examiner

*Primary Examiner* — Alfonso Perez Borroto
(74) *Attorney, Agent, or Firm* — Osha Bergman Watanabe & Burton LLP

(57) ABSTRACT

A distribution system includes: at least one Power Management System (PMS) that controls electrical power transmitted by the distribution system; and a first power station located at an onshore platform including an onshore terminal that distributes electric power to the first power station and to at least one onshore load, a plurality of onshore reactors that monitor inbound reactive power received from the onshore terminal or that monitor outbound reactive power sent to a remote location, and an onshore synchronous motor that operates on the inbound reactive power received from the onshore terminal.

17 Claims, 7 Drawing Sheets

USE OF SYNCHRONOUS MOTORS TO CONTROL POWER MANAGEMENT SYSTEM

BACKGROUND

Distributing electrical power requires configuring complex structures to respond to system disturbances to avoid blackouts. A robust electrical power distribution system ensures continuity of ongoing processes where electrical power is required. For electrical power distribution systems delivering electrical power to remote locations, power distribution structures are required to deliver robust, secure, and reliable power over large distances. In this regard, infrastructure relating to the power distribution structures must be fitted to sustain harsh environmental conditions over a long period of time. Power distribution structures at remote locations are usually located on desert areas, subterranean spaces, or submarine spaces where replacements are not preferred over long periods of time. Current power distribution schemes for delivering electrical power over long distances include power stations configured to regulate Direct Current (DC) or Alternative Current (AC). DC and AC distribution schemes usually require transformers along the distance to the remote location to maintain a desired voltage. In environments involving deserts, jungles, or oceans along the distance, maintaining a robust distribution of power requires a large financial investment as a result.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one or more embodiments, a distribution system comprises: at least one Power Management System (PMS) that controls electrical power transmitted by the distribution system; a first power station located at an onshore platform, comprising: an onshore terminal that distributes electric power to the first power station and to at least one onshore load, a plurality of onshore reactors that monitor inbound reactive power received from the onshore terminal or that monitor outbound reactive power sent to a remote location, and an onshore synchronous motor that operates on the inbound reactive power received from the onshore terminal; a second power station located at an offshore platform which is located at the remote location, the second power station comprising: an offshore terminal that receives electric power from the first power station and that delivers electric power to at least one offshore load, a plurality of offshore reactors that monitor inbound reactive power received from the first power station, and an offshore synchronous motor that operates on the inbound reactive power received from the first power station; and at least one submarine cable connected between the first power station and the second power station. The at least one PMS monitors compensation reactive power in the plurality of onshore reactors, the onshore synchronous motor, the plurality of offshore reactors, and the offshore synchronous motor.

According to one or more embodiments, a method for distributing electrical power to a remote location from an onshore platform, the method comprises: configuring at least one Power Management System (PMS) to control electrical power transmitted between a first power station and a second power station; installing the first power station located at an onshore terminal; distributing electric power to the first power station and to at least one onshore load; monitoring, by the at least one PMS, inbound reactive power received from the onshore terminal to the first power station or outbound reactive power sent from the first power station to one or more remote locations; installing the second power station at an offshore platform, the offshore platform being located at a remote location; connecting at least one submarine cable between the first power station and the second power station; receiving electric power from the first power station at the second power station through the at least one submarine cable; delivering electric power from the second power station to at least one offshore load; and monitoring, by the at least one PMS, inbound reactive power received from the first power station at the second power station. The first power station comprises: four onshore reactors; and an onshore synchronous motor. The second power station comprises: two offshore reactors; and an offshore synchronous motor.

According to one or more embodiments, a non-transitory computer readable medium storing instructions executable by a computer processor, the instructions comprises functionality for: configuring at least one Power Management System (PMS) to control electrical power transmitted between a first power station and a second power station; distributing electric power to a first power station and to at least one onshore load located at an onshore platform; monitoring, by the at least one PMS, inbound reactive power received from an onshore terminal to the first power station or outbound reactive power sent from the first power station to one or more remote locations; monitoring, by the at least one PMS, electric power received from the first power station at a second power station through at least one submarine cable that connects the first power station and the second power station; distributing electric power from the second power station to at least one offshore load; and monitoring, by the at least one PMS, inbound reactive power received from the first power station at the second power station.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
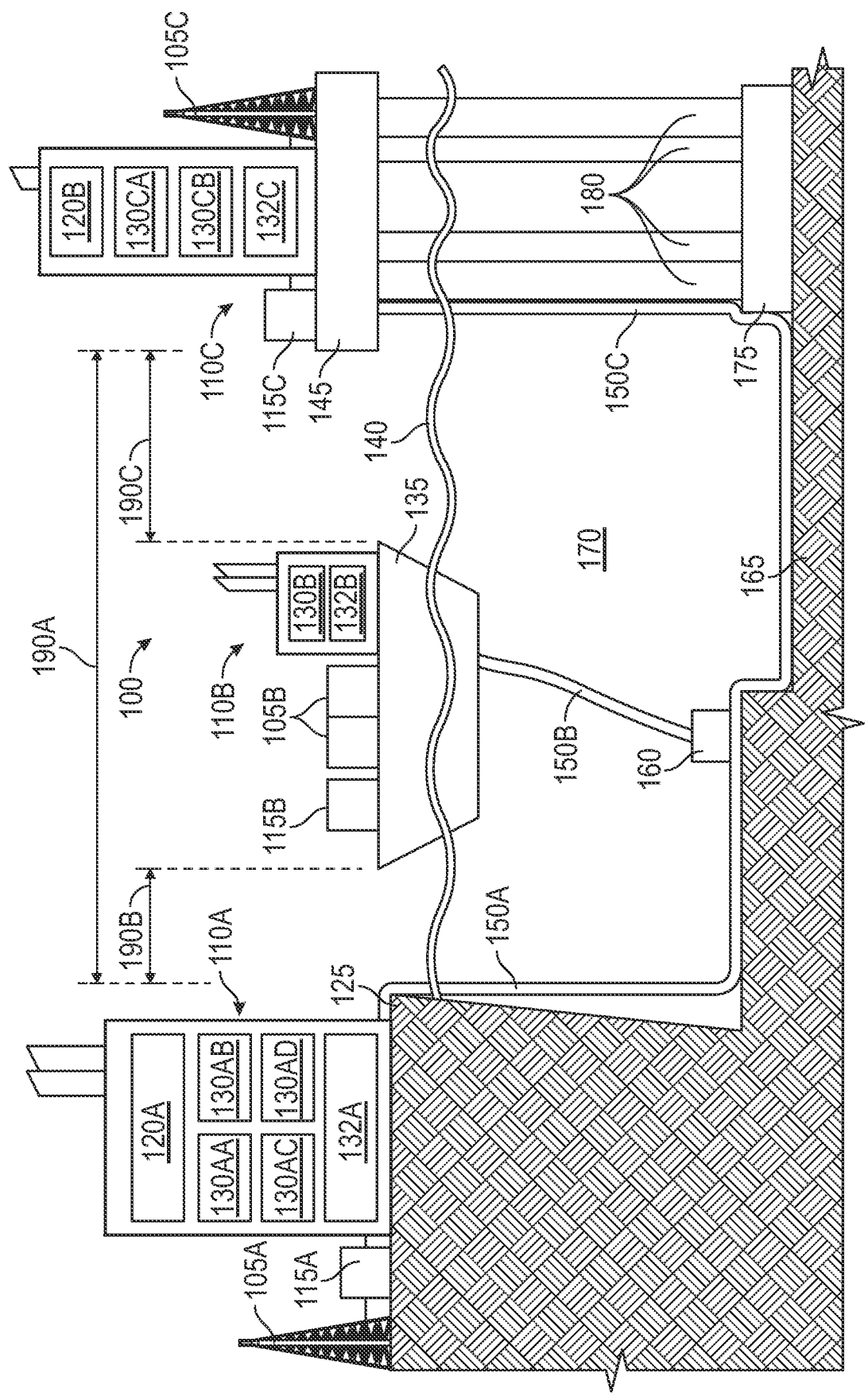
FIG. 1 shows a schematic diagram of a power distribution system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and a method for controlling electrical power (also referred to as power) distribution. In some embodiments, electrical power distribution is controlled over long distances or at power stations (i.e., substations) located at various remote locations. In some embodiments, power distribution schemes including Alternative Current (AC) are used over long distances. In this regard, some embodiments include compensation devices such as variable reactors and synchronous motors located at each end of a long distance to completely compensate for the line capacitance along the way, while maintaining high voltage between any two power stations connected with long connection cables within acceptable limits. One or more embodiments disclosed herein aim to stabilize the voltage and correct the power factor of a substation through the control of the synchronous motors along with shunt reactors utilizing the PMS.

In one or more embodiments, a Power Management System (PMS) is used to maintain robustness of the connection between any two power stations connected using cables alone (i.e., without requiring transformers installed along the distance). In some embodiments, the PMS controls a compensating voltage of the variable reactors and the synchronous motors to meet any reactive power requirements resulting from running cables over long distances. The PMS may be located on either end of the long distance. In one or more embodiments, the PMS is located at both ends of the long distance such that two PMSs may be configured for controlling power distribution in an entire power distribution system. In some embodiments, one PMS may be a primary PMS used for controlling the entire power distribution system, while an additional PMS may be a secondary PMS used as a hot standby for the primary PMS when, for example, the primary PMS is disconnected for maintenance. Further, in the event of a system disturbance, either PMS may assume control of the entirety of the distributed electrical power system.

FIG. 1 shows a schematic diagram illustrating a power distribution system 100 including power stations 110A, 110B and 110C located at different locations separated over long distances 190A, 190B and 190C. The long distances 190A-190C, not drawn to scale, are shown to be over a large body of water 170 (e.g., an ocean, a sea, or a large lake) such that the power station 110A is shown located on an onshore platform 125, the power station 110B is shown located on a permanently moored platform 135, and the power station 110C is shown located on an offshore platform 145. In some embodiments, the power stations 110A-110C are connected to one another using at least one submarine cable 150A, 150B, or 150C laid on an underwater floor 165 (e.g., seabed) over the long distances 190A-190C.

In some embodiments, a first power station 110A is a combination of one or more substations or power plants at the onshore platform 125. The onshore platform 125 may be an onshore location such as a lot of land located on a large area of a continent or an island. The first power station 110A may include a first PMS 120A and at least four reactors 130AA-130AD and at least one synchronous motor 132A connected to a first submarine cable 150A, an onshore terminal 115A, and an onshore load 105A. The first PMS 120A may be a primary PMS that controls and monitors the distribution of electric power in the power distribution system 100. In one or more embodiments, the reactors 130AA-130AD may be variable shunt reactors configured to adapt upon receiving immediate feedback or control instructions from the PMS (120A). Similarly, in one or more embodiments, the synchronous motor 132A may be configured to adapt upon receiving immediate feedback or control instructions from the PMS (120A). The onshore terminal 115A may be a combination of substation equipment configured for receiving power from a power grid outside of the first power station 110A (not shown) and delivering processed power to other locations of the first power station 110A. The onshore load 105A may be hardware located on the onshore platform 125 which requires using processed power from the onshore terminal 115A. The onshore load 105A may be electric equipment used in oil and gas applications including a resistive load (e.g., a drilling rig).

In some embodiments, a second power station 110B is a combination of one or more substations or power plants at the permanently moored platform 135. The permanently moored platform 135 may be an offshore location that is configured to remain fixed in a geological location above water level 140 such as a boat or platform configured for withstanding large weight loads. The permanently moored platform 135 may be fixed in the geological location using an anchor 160 connected through mooring cables (not shown). The second power station 110B may include at least one reactor 130B and at least one synchronous motor 132B connected to a second submarine cable 150B, boat terminal 115B, and one or more loads 105B. The reactor 130B may be a variable shunt reactor configured to adapt upon receiving immediate feedback or control instructions from a PMS (120A, 120B). Similarly, the synchronous motor 132B may be configured to adapt upon receiving immediate feedback or control instructions from the PMS (120A, 120B). The boat terminal 115B may be a combination of substation equipment configured for receiving power from the first power station 110A and delivering processed power to other locations of the second power station 110B. The various loads 105B may be hardware located on the permanently moored platform 135 which require using processed power from the boat terminal 115B. The one or more loads 105B may be electric equipment used in oil and gas applications including a resistive load (e.g., electronic pressure gauges for hydrocarbon tanks).

In some embodiments, a third power station 110C is a combination of one or more substations or power plants at the offshore platform 145. The offshore platform 145 may be an offshore location such as a main deck positioned above the water level 140 and fixed to a geological location for performing drilling operations. The offshore platform 145 may be fixed in the geological location using an anchor such as piles 175 connected through risers 180. The third power station 110C may include a second PMS 120B and at least two reactors 130CA and 130CB and at least one synchronous motor 132C connected to a third submarine cable 150C, an offshore terminal 115C, and an offshore load 105C. The second PMS 120B may be a secondary PMS that controls and monitors the distribution of electric power in the power distribution system 100. The reactors 130CA and 130CB may be variable shunt reactors configured to adapt upon receiving immediate feedback or control instructions from a PMS (120A, 120B). Similarly, the synchronous motor 132C may be configured to adapt upon receiving immediate feedback or control instructions from the PMS (120A, 120B). The offshore terminal 115C may be a combination of substation equipment configured for receiving power from the first power station 110A and delivering processed power to other locations of the third power station 110C. The offshore load 105C may be hardware located on the offshore platform 145 which require using processed power from the offshore terminal 115C. The offshore load 105C may be electric equipment used in oil and gas applications including a resistive load (e.g., a drilling rig).

In some embodiments, the submarine cables 150A-150C may include one or more fiber optic cables, internet connection cables, and power cables. The submarine cables 150A-150C may extend over large distances 190A-190C. These distances may be between 70 kilometers (km) and 300 km, which may cause the submarine cables 150A-150C to generate large amounts of capacitance reactive power during high-voltage transmissions. The submarine cables 150A-150C may be graded for high-voltages such that each submarine cable may transport between 200 kilovolts (kV) to 350 kV. As such, because reactive power is directly proportional to voltage, the capacitance reactive power (negative reactive power) created from using long submarine cables 150A-150C may be greater than 300 mega volt amps (MVAR) per submarine cable. In one or more embodiments, the PMSs 120A or 120B control the variable shunt reactors 130AA-130CB and the synchronous motors 132A-132C to directly absorb any capacitance reactive power generated.

In some embodiments, the first distance 190A may be approximately 180 km transporting power using 230 kV submarine cables 150A and 150C, and generating around negative 400 MVAR. In this case, voltage may be controlled constantly at both sides of the submarine cables 150A and 150C through controlling the variable shunt reactors 130AA-130AD, 130CA, and 130CB and through controlling the excitation system of synchronous motors 132A and 132C. The PMS may operate in two modes of operation. The first mode is to request both the synchronous motors' excitation system and the variable shunt reactors to respond during any major change in the voltage level due to sudden major load starting and tripping or tripping of any shunt reactors. However, because the synchronous motors respond fast and almost instantaneously whereas the shunt reactors respond slowly and require a few seconds to adjust, the synchronous motors respond by 10% to 20% of its size based on their loading conditions and then compensation reduces to zero as the shunt reactors stabilize the voltage and provide 100% compensation after the few seconds. The second mode of operation is to request only the synchronous motors to react for small reactive power variations that fall within the synchronous motors' capabilities. The PMS used to control power distribution in power stations 110A and 110C, further controls the voltage at both sides of the submarine cables 150A and 150C by regulating the corresponding variable shunt reactors 130AA-130AD or 130CA and 130CB and the corresponding synchronous motors 132A or 132C.

In some embodiments, the PMSs 120A and 120B may be two redundant PMS controllers to control all variable shunt reactors 130AA-130CB and all synchronous motors 132A-132C located at the onshore platform 125, the permanently moored platform 135, and the offshore platform 145. These PMSs 120A and 120B may be redundant and communicating constantly such that one PMS may fully control all six variable shunt reactors 130AA-130CB and all three synchronous motors 132A-132C, and another PMS may be a hot standby. In this regard, the PMSs may dynamically maintain electrical parameters (i.e., voltages and power factors) within acceptable limits in all loading scenarios for facilities located in the power distribution system 100. Advantageously, in some embodiments, dynamically maintaining electrical parameters eliminates plant shutdowns due to overvoltage caused by changing loading conditions. To this point, the PMSs 120A and 120B constitute a fully automated system for all the reactors and all the synchronous motors while meeting requirement of all the loading scenarios.

Those skilled in the art will appreciate that FIG. 1 is an illustrative example of a distribution system in accordance with embodiments disclosed herein, and that components shown may be omitted, duplicated, or combined without departing from the scope herein. For example, while six (6) shunt reactors are shown in FIG. 1, there may be any number of suitable reactors associated with each power station in the distribution system. Similarly, while three (3) synchronous motors are shown in FIG. 1, there may be any number of suitable synchronous motors associated with each power station in the distribution system. Further, for example, there may be only an onshore power station 110A and offshore power station 110C controlled by two redundant PMSs 120A and 120B, without a permanently moored power station 110B in between.

Figure 2:
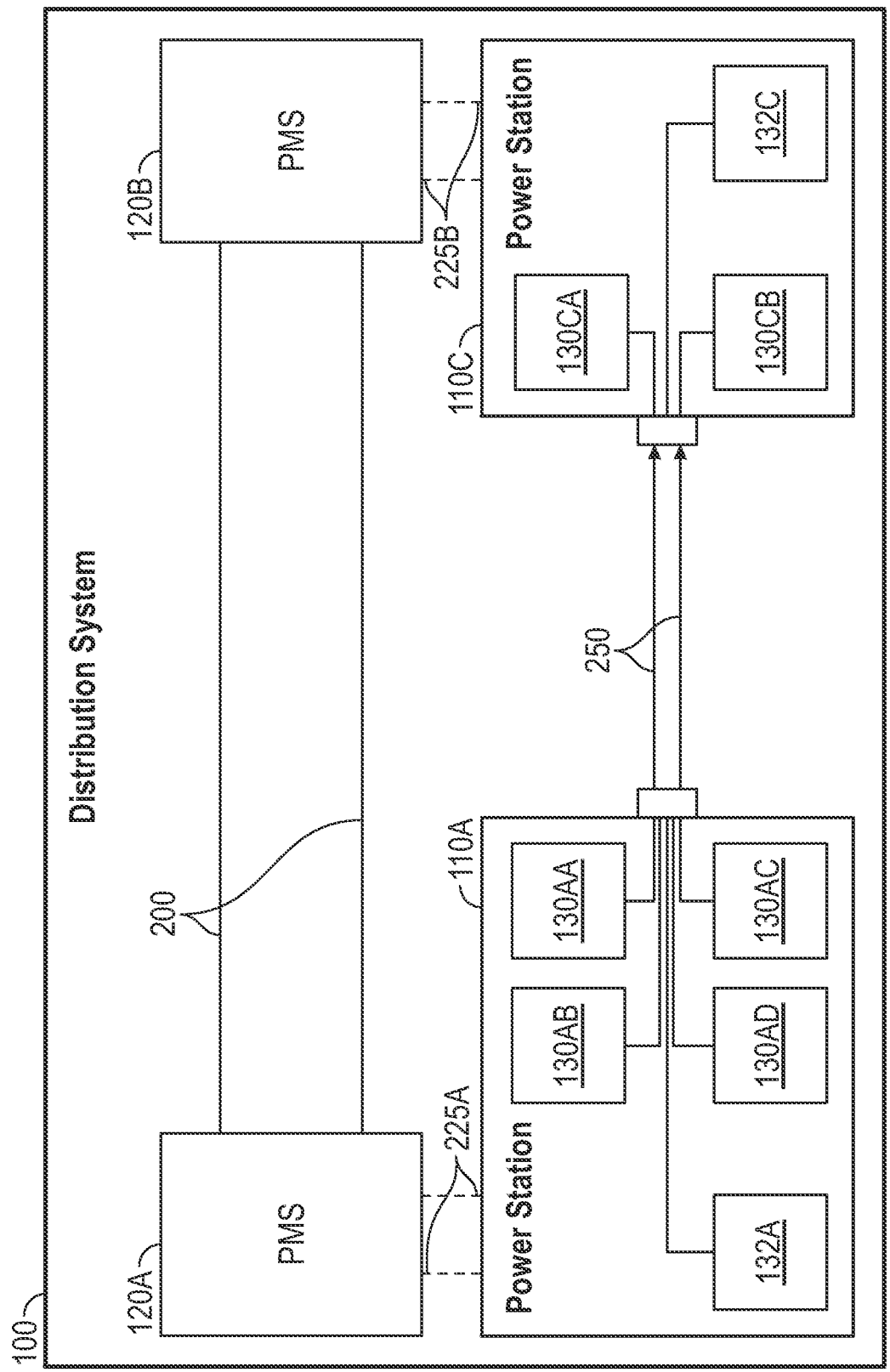
FIG. 2 shows a schematic diagram of a power distribution system in accordance with one or more embodiments.

FIG. 2 shows a schematic showing internal connections between electronic elements in the power distribution system 100. In some embodiments, the PMS 120A and the PMS 120B may be connected to one another through fiber optic cables 200 such that both PMSs may maintain a constant communication link. In some embodiments, both PMSs may maintain a same control outreach over the power being delivered in the entire power distribution system 100. In this regard, the PMSs 120A and 120B may have control links 225A and 225B for monitoring and modifying conditions in the power station 110A and the power station 110C. Specifically, either PMS may control any of the variable shunt reactors 130AA-130AD, 130CA, and 130CB and any of the synchronous motors 132A and 132C through control lines 225A and 225B.

In some embodiments, using transmission cables 250, the power distribution system 100 may deliver electric power from the power station 110A to the power station 110C. In one or more embodiments, when one PMS that is operating as a primary PMS is taken offline, another PMS operating as a hot standby may take over management of the power distribution system 100 such that operations in the power distribution system 100 may continue without requiring any downtime of the power distribution system 100. In one or more embodiments, the optical fiber 200 and/or the transmission cables 250 may be disposed in one or more of the submarine cables 150A-150C described in reference to FIG. 1.

In one or more embodiments, controlling all reactors and all synchronous motors dynamically and automatically at both sides of the submarine cables 150A-150C through the PMS 120 may avoid any system overvoltage and ensure reliable power supply system in loading scenarios. Specifically, overvoltage risks may be mitigated by constantly monitoring the system and automatically adjusting the reactive compensation from the variable shunt reactors 130AA-130AD, 130CA, and 130CB and the synchronous motors 132A and 132C using the PMSs 120A and 120B.

As shown in FIG. 2, embodiments disclosed herein provide a centralized mega volt amps (MVARs) controller acting as a PMS with two redundant power management controllers in both an onshore substation as well as an offshore substation. The PMS takes the input from the power system automation (PSA) and controls the tap changers of the multiple 230 kV shunt reactors and the excitation system of the synchronous motors at both power substations to regulate the voltage on both sides of the submarine cable as well as within the length/distance of the submarine cable.

Figure 3:
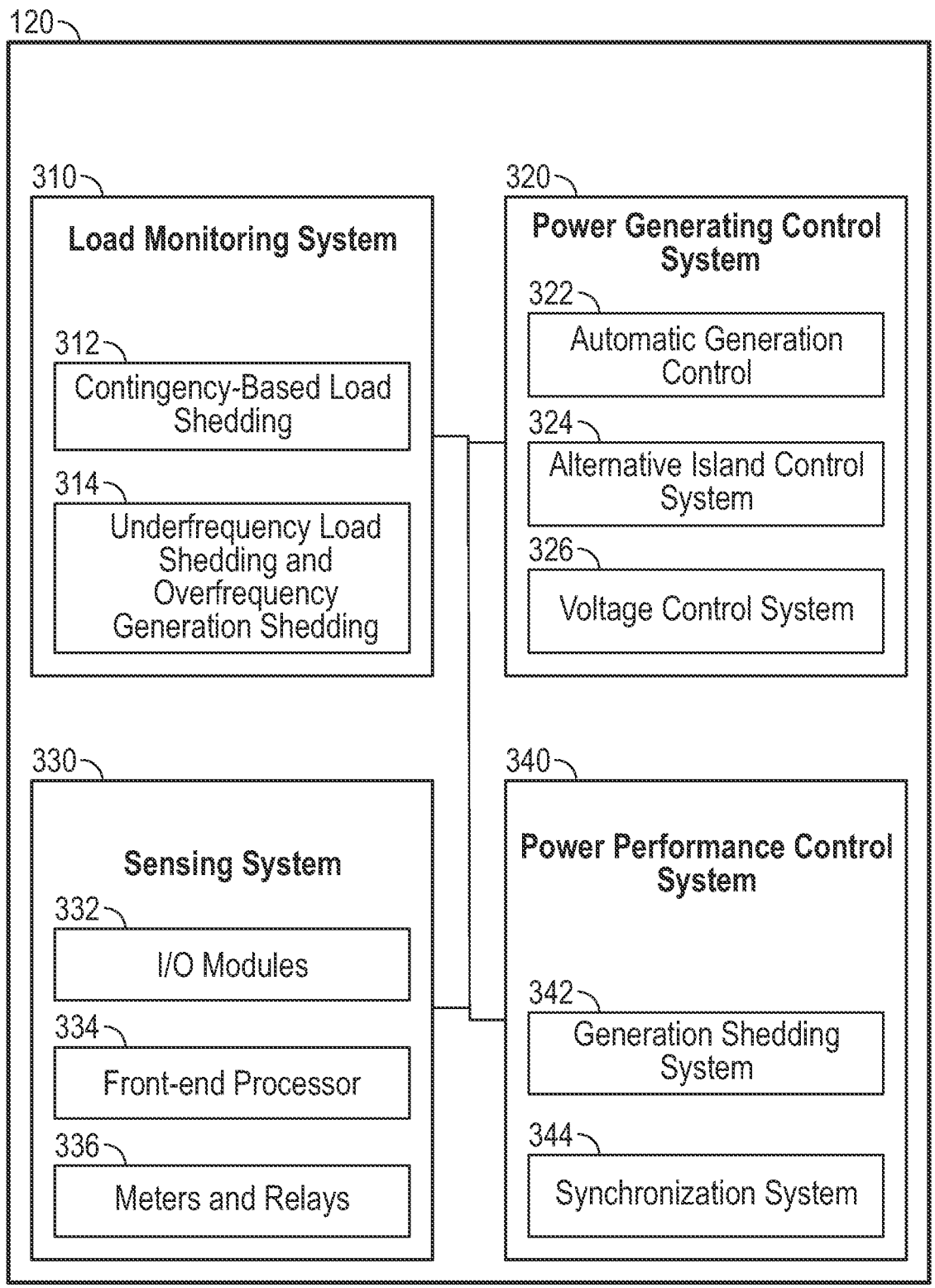
FIG. 3 shows a schematic diagram of a Power Management System (PMS) in accordance with one or more embodiments.

FIG. 3 shows a schematic diagram showing various subsystems constituting a PMS 120. In some embodiments, the PMS 120 includes electronic components that enable the PMS 120 to perform load monitoring functions, data collecting functions, and/or processing functions. In some embodiments, the electronic components may be configured to create communication links and control links with each element in the power distribution system 100. In some embodiments, the electronic components of the PMS 120 may be a combination of hardware and software including a load monitoring system 310, a control system 320, a sensing system 330, and a power distribution system 340. In some embodiments, these electronic components communicate with one another through wired or wireless connections for exchanging collected data and processed data. In this regard, connections including control communications may be implemented using wires or wireless protocols while connections including power transmissions may be implemented using wires rated for a specific voltage.

In some embodiments, the PMS 120 may be a utility energy management system performing remedial action schemes. The PMS 120 may combine low-speed functions, such as automatic generation control (AGC), Volt/VAR control systems (VCSs), and tie line control, with high-speed functions, such as load shedding and generation shedding. The PMS 120 may require auto-synchronization systems that synchronize generators with the power distribution system 100. The PMS 120 may ensure that robust operations are performed in the power distribution system 100 in a coherent fashion to control the power distribution system 100 during all manner of low-speed and high-speed disturbances or contingencies. A contingency may be any event that results in the loss of power to a grid section. Contingencies may occur when a tie line, bus coupler, sectionalizer, or generator breaker opens under load. A contingency may also be the overload of a transformer, cable section, or generator.

In some embodiments, the PMS 120 may be completely integrated in the power distribution system 100 for protection, control and automation of the power stations 110A-110C. These functions may require devices such as protective relays, embedded computers, logic controllers, I/O modules, and communications and engineering tool sets. A communications architecture for the PMS 120 may be using fully redundant time-division multiplexing-based networks connecting all power stations.

In some embodiments, a load monitoring system 310 may perform adaptive measurements for changing operational scenarios for an allowable operational region algorithm. The allowable operational region algorithm may be one or more computational parameters for dynamically determining an area of operation for a generator based on a power capability curve. Because generator capability curves may change during system operation, the allowable operational region may be dynamically adjusted by the PMS depending on any curve parameter relating to the power distribution system 100 (i.e., resistive load or reactive power change) and any fixed operator-entered regulation limits.

In some embodiments, the load monitoring system 310 may include a contingency-based load-shedding system (CLS) 312. The CLS 312 may be a protection algorithm that sheds load to maintain a power balance between prime movers and electric power system loads. The CLS 312 may perform load shedding by reducing a total electrical load in the power stations to less than a calculated available turbine and generator capacity after a contingency occurs (i.e., an emergency shut down of a system). Because of the power system net rotating inertia, the CLS 312 may operate fast enough that loads are shed prior to any significant decay in frequency. In other words, when an event occurs that would cause a contingency situation, the CLS 312 may determine a number of loads to shed based on any contingency statuses and metering, user-defined load-shedding priorities, user-defined incremental reserve margin values, topology statuses, and load statuses and metering.

The overall reliability of the load- and generation-shedding systems is improved with redundant controllers using different algorithms. These different algorithms are the underfrequency load-shedding (UFLS) and overfrequency generation-shedding (OFGS) 314. The UFLS and OFGS 314 may be algorithms designed to be a load-shedding protection system secondary to the CLS 312. Because the UFLS requires frequency to decrease, underfrequency triggers may happen later than a CLS 312 contingency trigger. As such, in some embodiments, the CLS 312 scheme minimizes process, frequency, and power disturbances such that UFLS events may therefore be associated with power swings and processing disturbances.

In some embodiments, the PMS 120 may include a generation control system (GCS) 320 that operates over a span of seconds or minutes to slowly correct the system frequency, voltage, active and reactive power flows, power factor, and more. The GCS 320 may control the active and the reactive power flow from generators. The GCS 320 may also participate in system synchronization efforts. In one or more embodiments, the GCS 320 may include an automatic generation control (AGC) 322, a voltage control system (VCS) 326, and an alternative island control system (ICS) 324. Such control systems may be connected to generator unit controllers of the power stations using an interface device that sends and receives control and status signals through one of the established control links 225A and 225B.

The AGC 322 may set points for each generator controlled by the PMS 120 such that an optimal load may be determined for a load-sharing controller. The optimal load-sharing controller receives bias commands from either the frequency or tie flow controller algorithms in the PMS 120. In some embodiments, the ICS 324 may dynamically create individual AGC 322 and VCS 326 control loops for an island grid, thereby allowing the PMS 120 to adapt to all electrical grid conditions as required by any one of the power stations 110A-110C. In some embodiments, the VCS 326 controls a voltage value in any given portion of the power distribution system 100 in coordination with one or more electronic components in the PMS 120.

In one or more embodiments, the sensing system 330 may include various peripherals and instruments used by the PMS 120 to identify external parameters surrounding the power distribution system 100. In some embodiments, the sensing system 330 may include I/O modules 332, at least one front-end processor 334, and meters and relays 336. These devices may be incorporated into instrumentation devices and controlling systems disposed in other portions of the PMS 120.

In one or more embodiments, the power distribution system 340 may include devices for rebalancing the power in the power distribution system 100. In some embodiments, the power distribution system 340 may include a generation-shedding system (GSS) 342 and a synchronization system 344. In some embodiments, the GSS 342 keeps a steady-state frequency of the power system at nominal during a major loss of load. By keeping the frequency at nominal, turbines revolutions per minute (rpm) may be also stabilized, thus keeping turbine generators online and preventing system power outages (i.e., blackouts). In some embodiments, the synchronization system 344 may minimize disturbances created by load shedding.

In some embodiments, the GSS 342 is a fast, contingency-based algorithm that sheds and runs back generators to maintain a power balance between loads and generation. Because of the power system net rotating inertia, the GSS 342 operates fast enough that generation sheds prior to any significant overshoot in frequency. In some embodiments, a GSS contingency is any event that results in excess generation on an island grid. Similar to CLS 312, the GSS 342 may operate by making generation-shedding and/or runback decisions based on three basic categories of information: contingency statuses and metering, topology statuses, and generator statuses and metering.

In some embodiments, when a GSS 342 controller detects a contingency breaker open condition, it determines the generation to shed or run back based on the contingency status and metering, user-defined generator-shedding and runback priorities, user-defined decremental reserve margin (DRM) values, topology statuses, and generator statuses and metering.

In some embodiments, the synchronization system 344 may be used to synchronize individual generators to power grids. These systems may be required to function automatically with minimal human supervision because they must dispatch multiple generators simultaneously to reduce slip and voltage differences at any one of the interconnection points. In some embodiments, the synchronization system 344 may replace analog synchroscopes and manual breaker closings. In some embodiments, the synchronization system 344 measures the voltage and frequency on both sides of several breakers (bus couplers, bus ties, and tie line breakers) to send proportional correction pulses for adjusting electronic parameters as necessary to automatically close a breaker. Advantageously, this process enables safe, secure, unattended synchronization of the generators connected to one bus and the generators on the opposing bus. In the event of a PMS being a hot standby PMS, the synchronization system 344 may perform coupling operations to take over operations controls previously performed by a primary PMS.

Those skilled in the art will appreciate that FIG. 3 is an illustrative example of a PMS in accordance with embodiments disclosed herein, and that components shown may be omitted, duplicated, or combined without departing from the scope herein. For example, while one load monitoring system is shown in FIG. 3, there may be any number of suitable load controls associated with each PMS in the distribution system.

Figure 4:
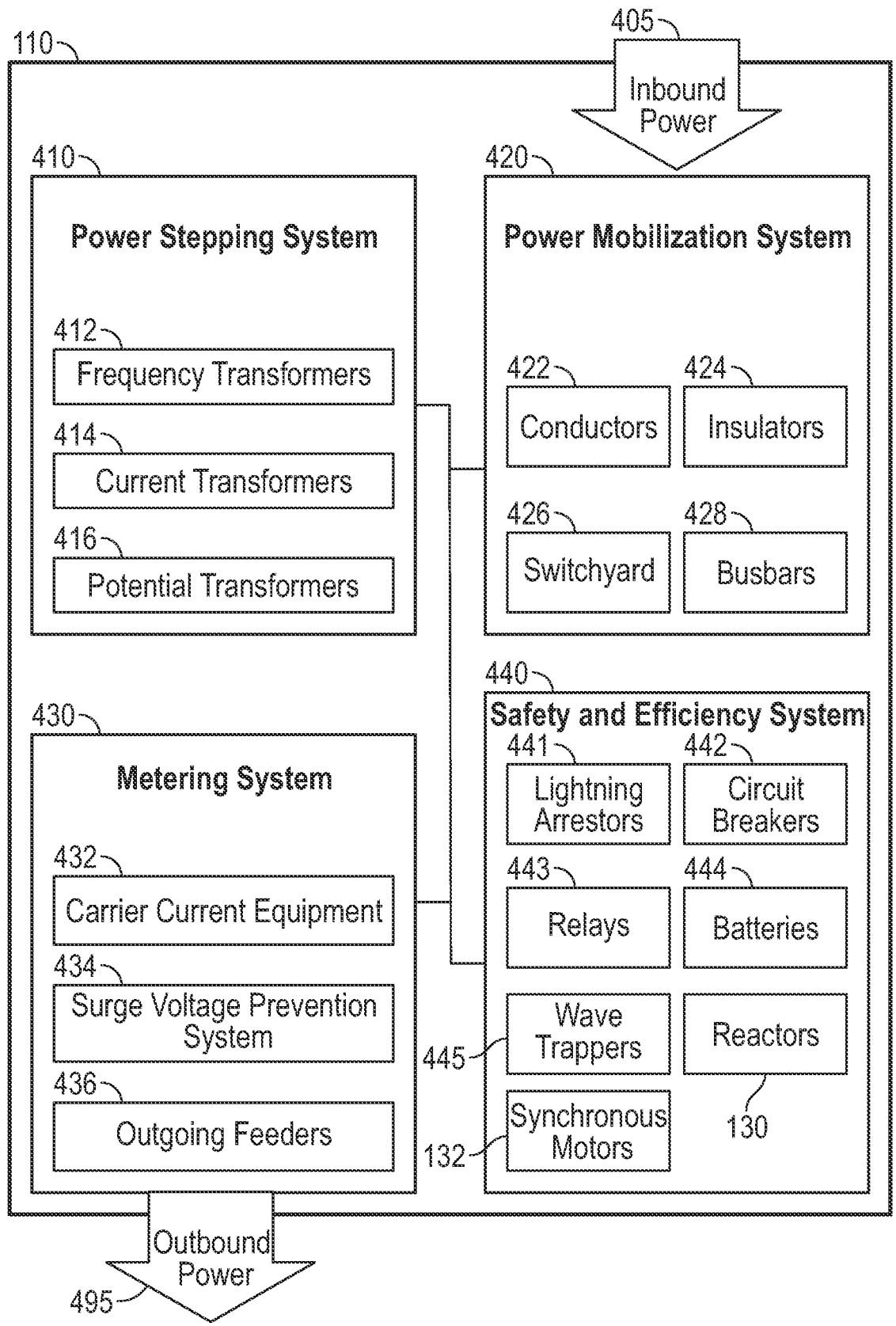
FIG. 4 shows a schematic diagram of a power station in accordance with one or more embodiments.

FIG. 4 shows a power station 110 that controls transmission, production and/or distribution of power toward one or more electronic components of the power distribution system 100. In some embodiments, the power station 110 receives inbound power 405 from another power station or another power distribution system outside of the power distribution system 100. In some embodiments, the power station 110 may transmit outbound power 495 to another power station or a power distribution system outside of the power distribution system 100. Further, in some embodiments, the power station 110 may be any of the power stations 110A-110C described in reference to FIG. 1. This power station 110 may include a power stepping system 410, a power mobilization system 420, a metering system 430, and a safety and efficiency system 440. In some embodiments, the power station 110 may be an electrical substation or a power plant. The PMS 120 may monitor and control all operations of the power station 110 using one or more electronic components described in reference to FIG. 3.

In some embodiments, the power stepping system 410 may include frequency transformers 412, current transformers 414, and a potential transformer 416. In some embodiments, the instrument transformers 412 are static devices utilized for reduction of higher currents and voltages. In some embodiments, the current transformers 414 are devices utilized for the transformation of higher value currents into lower values. The current transformers 414 may be utilized in an analogous manner to that of AC instruments, control apparatus, and meters. In some embodiments, potential transformers 416 may be utilized for converting high voltages to lower voltages for protection of relay system and for lower rating metering of voltage measurements.

In some embodiments, the power mobilization system 420 may include conductors 422, insulators 424, a switchyard 426, and busbars 428. In some embodiments, the conductors 422 are materials which permit flow of electrons through it. In power station 110, these materials may be copper and aluminum bars. The conductors 422 may be utilized for transmission of energy from place to place over various power stations. In some embodiments, insulators 424 are the materials which do not permit flow of electrons throughout. In some embodiments, the switchyard 426 may be a combination of devices and infrastructure configured for distributing electric power in a closed area. In some embodiments, busbars 428 may be a kind of electrical junction which has outgoing and incoming current paths. If a fault occurs in the busbars 428, entire components connected to that specific section may be tripped for giving thorough isolation in a small time.

In some embodiments, the metering system 430 may include carrier current equipment 432, a surge voltage prevention system 434, and outgoing feeders 436. In some embodiments, the carrier current equipment 432 may be installed in the power station 110 for the purpose of communication, supervisory control, telemetry, and/or relaying. Such equipment may be mounted on a room which is known as carrier room and is connected across power circuit handling high voltages. In some embodiments, the surge voltage prevention system 434 may be hardware and/or software configured to prevent voltage surges. There are several reasons for overvoltage which may be caused due to a sudden alteration in conditions of the system (e.g., load rejection, faults, or switching operations) or because of natural reasons (e.g., lighting). In some embodiments, the outgoing feeders 436 may connect to a bus of the power station 110 for carrying power from the power station 110 to service points or dissipaters.

In some embodiments, the safety and efficiency system 440 may include lighting arrestors 441, circuit breakers 442, relays 443, reactors 130, synchronous motors 132, batteries 444, and wave trappers 445. In some embodiments, the lighting arrestors 441 may be protecting equipment to protect the power station 110 from high voltages while limiting the amplitude and duration of a current's flow. In some embodiments, the circuit breakers 442 may be switches utilized for closing or opening circuits at the time when a fault occurs within the system. In some embodiments, the relays 443 may be a dedicated component of electrical substation equipment for the protection of system against abnormal situations (e.g., faults). Relays 443 may be sensing devices which are devoted for sensing faults and are determining its location as well as sending interruption message of tripped command to the specific point of the circuit. In some embodiments, the reactors 130 may be defined as a set of numerous identical capacitors which are connected either in parallel or series inside an enclosure and are utilized for the correction of power factor as well as protection of circuitry of the power station. These may act as the source of reactive power and are thus reducing phase difference amid current and voltage. Similar to the reactors 130, in some embodiments, the synchronous motor 132 that operates on the inbound power 405 may act instantaneously as the source of reactive power and is thus stabilizing the voltage within its capability depending on the loading condition. However, unlike the reactors 130, the synchronous motor 132 may take full action to stabilize voltage and/or to correct power factor. The action of the synchronous motor 132 may be achieved by adjustment of motor field excitation based on input signals to the synchronous motor 132. Accordingly, the action of the synchronous motor 132 may be performed within a second or in milliseconds, compared with tens of seconds by the reactors 130, in which changing tap positions of the rectors 130 based on input signals to the rectors 130 is required. When the synchronous motor 132 is used for this purpose, operations limits of the synchronous motor 132 may need to be identified and capability curves of the synchronous motor 132 may need to be considered.

Advantageously, use of the synchronous motor 132 would reduce the number of the reactors 130 and/or decrease the size of the shunt reactors on load tap changer operations and hence increase equipment lifetime. Further, because the synchronous motors are fast-reacting elements as opposed to the shunt reactors, it provides a faster voltage control mechanism. Use of the synchronous motor 132 would minimize loss of the power station 110 associated with selection of an optimum power factor. In some embodiments, the batteries 444 may be energy storage units. In some embodiments, the wave trappers 445 may be devices for trapping of high-frequency waves or reflections. The high-frequency waves coming from other power stations or other localities may disturb the current and voltages. As such, the wave trapper may be basically tripping high-frequency waves and is then diverting the waves into telecom panel.

Those skilled in the art will appreciate that FIG. 4 is an illustrative example of a power station in accordance with embodiments disclosed herein, and that components shown may be omitted, duplicated, or combined without departing from the scope herein.

Figure 5:
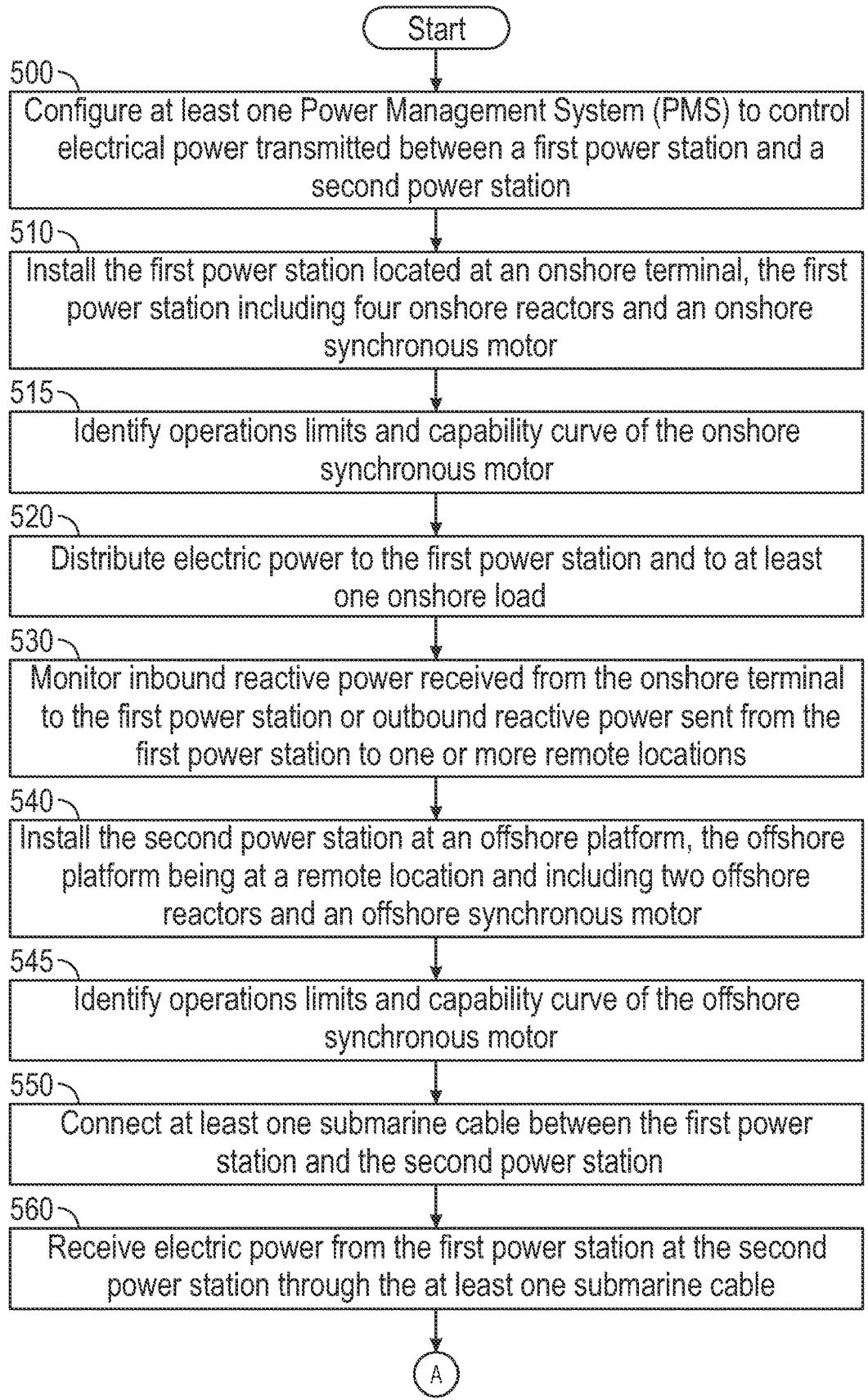
FIG. 5 shows a flowchart in accordance with one or more embodiments.
Figure 5:
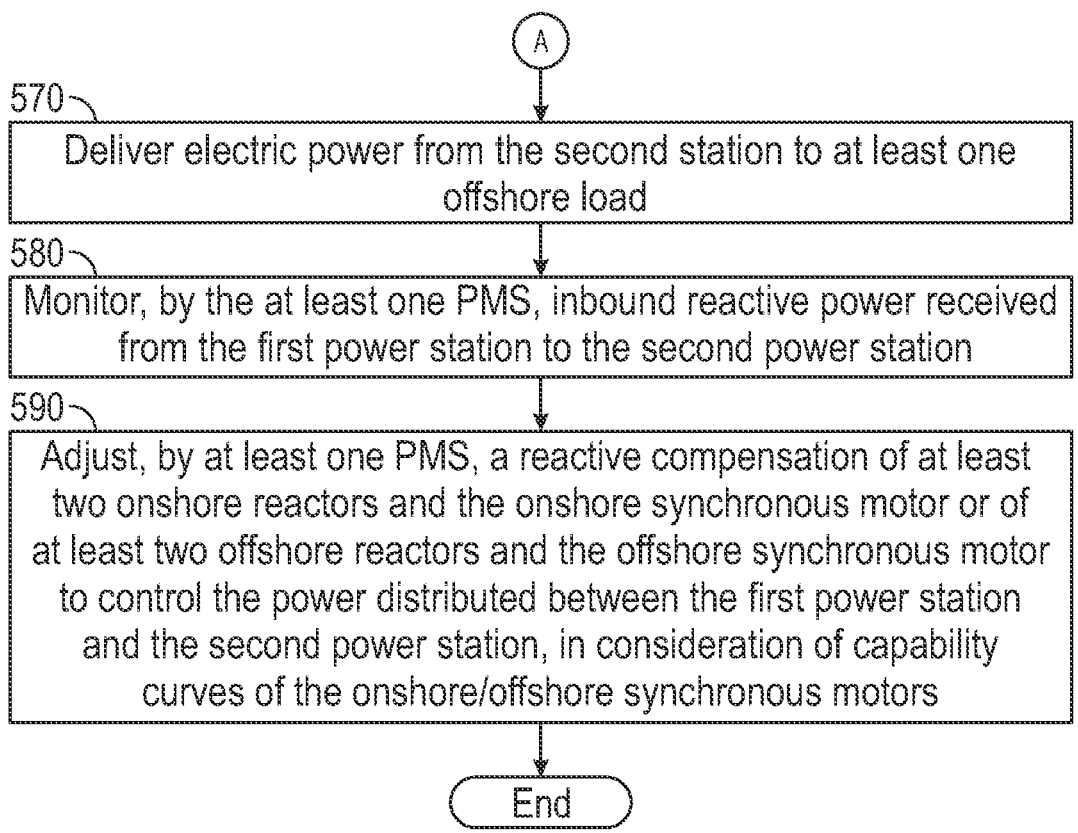

FIG. 5 shows a flowchart in accordance with one or more embodiments. Specifically, FIG. 5 describes a method for distributing electrical power to a remote location from an onshore platform 110 as described in reference to FIGS. 1-4. Further, one or more blocks in FIG. 5 may be performed by one or more components as described in FIG. 6 (e.g., computing system 600 including computer processor(s) 604 and communication interface 608). While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, the PMS 120 may be configured to control electrical reactive power transmitted between a first power station 110A and a second power station 110C. The PMS 120 may be configured into the power distribution system 100 to control every reactive power transmission between the two power stations.

In Block 510, the first power station 110A that includes the onshore reactors 130AA-130AD and the onshore synchronous motor 132A is installed at an onshore terminal 125. The installation may be performed using various construction procedures. Along with the first power station 110A, power station equipment such as the equipment described in reference to FIG. 4 may be installed. In some embodiments, the onshore terminal 125 may be a piece of land or an island capable of sustaining electrical components and electronic equipment associated to the power station 110A.

In Block 515, operational limits and a capability curve of the onshore synchronous motor 132A are identified.

In Block 520, electric power is distributed to the first power station 110A and to at least one onshore load 115A. Electric power is distributed to various locations in the onshore platform 125. In some embodiments, the onshore load 105A may be regulated using one or more procedures as described in reference to the PMSs 120A and 120B.

In Block 530, inbound reactive power 405 received from the onshore terminal 125 to the first power station 110A is monitored. Alternatively, in one or more embodiments, outbound reactive power 495 sent from the first power station 110A to one or more remote locations is monitored. In both scenarios, the PMS 120A or the PMS 120B determine monitoring parameters for the inbound reactive power 405 or the outbound reactive power 495 based on predetermined parameters.

In Block 540, the second power station 110C that includes the offshore reactors 130CA and 130CB and the offshore synchronous motor 132C is installed at an offshore platform 145, the offshore platform 145 being at a location remote from the onshore platform. The offshore platform 145 may be an offshore deck including a main deck and mid deck disposed on raisers 180, as shown in FIG. 1.

In Block 545, operations limits and capability curve of the offshore synchronous motor 132C are identified.

In Block 550, at least one submarine cable 150A is connected between the first power station and the second power station. The submarine cable 150A may be the same as submarine cables 150B and 150C. As such, the submarine cable 150A may be extended for a first distance 190A or over a combination of distances 190B and 190C.

In Block 560, electric power is received from the first power station 110A at the second power station 110C through the at least one submarine cable 150A. The connection may be established without using intermediate connections or transformers along the distances such that only the power stations 110A and 110C are located at each end of the submarine cable 150.

In Block 570, electric power is delivered from the second power station 150B to at least one offshore load 105C. Similar to the electrical distribution power delivered to the onshore load 105A, the offshore load 105C may be regulated using one or more procedures as described in reference to the PMSs 120A and 120B.

In Block 580, the PMS 120 monitors inbound reactive power 405 received from the first power station 110A by the second power station 110C.

In Block 590, the at least one PMS 120 adjusts a reactive compensation of any variable reactors and synchronous motors located in the first power station 110A or the second power station 110C to control electric power distributed between the first power station 110A and the second power station 110C. The adjustment of the reactive compensation is performed in consideration of capability curves of the onshore synchronous motor 132A and of the offshore synchronous motor 132C identified in Blocks 515 and 545 above.

In one or more embodiments, the PMS 120A and the PMS 120B may be two redundant power management controllers that control all electronic equipment and electronic components at the first power station 110A and the second power station 110C. In some embodiments, the PMS 120A and the PMS 120B are redundant and communicating constantly such that one PMS takes full control for all electronic equipment and devices and another PMS is a hot standby for the primary PMS. The PMSs may be programed to dynamically maintain voltage and power factor within acceptable limit in loading scenarios for the power stations 110A and 110C to eliminate shutdown due to overvoltage caused by changing loading conditions.

The PMS 120 is used for controlling the variable reactors 130AA-130AD, 130CA, and 130CB and the synchronous motors 132A and 132C in island mode (i.e., in which the PMS 120 controls a small power grid) between two power stations 110A and 110C that are interconnected radially through long submarine cables 150A and 150C. For radially connected power stations 110A and 110C, voltage may be regulated on both sides of the submarine cables 150A and 150C for preventing excess of a maximum continuous voltage level in the submarine cables 150A and 150C at any point within the distance. In this regard, the PMS 120 acts as a centralized MVAR controller to mitigate any negative MVARs generated by the submarine cables 150A and 150C.

One or more embodiments disclosed herein is directed toward a power supply to Onshore facility that feeds an offshore facility through one or more long submarine cables generating approximately negative 400 MVARs which requires control through variable shunt reactors and synchronous motors. More specifically, the variable shunt reactors and the synchronous motors are controlled by one or more Power Management System (PMSs), which in some existing facilities was used to control the generators. For radially connected power substations, as shown in FIG. 1, the PMSs regulate the voltage on both sides as well as prevent exceeding the maximum continuous voltage level of the submarine cable at any point within the 90 km length of the cable, as 230 kV submarine cables produce a lot of negative MVARs which needs to be absorbed by positive MVARs to stabilize the voltage.

Embodiments disclosed herein may be implemented using virtually any type of computing system, regardless of the platform being used. In some embodiments, one or more modules of the PMS 120 may be computer systems located at a remote location such that controlling and monitoring of electric power is processed away from the power stations 110A-110C. In some embodiments, the PMSs 120A and 120B may be fully implemented in a computer system. In some embodiments, the computing system may be implemented on remote or handheld devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 6:
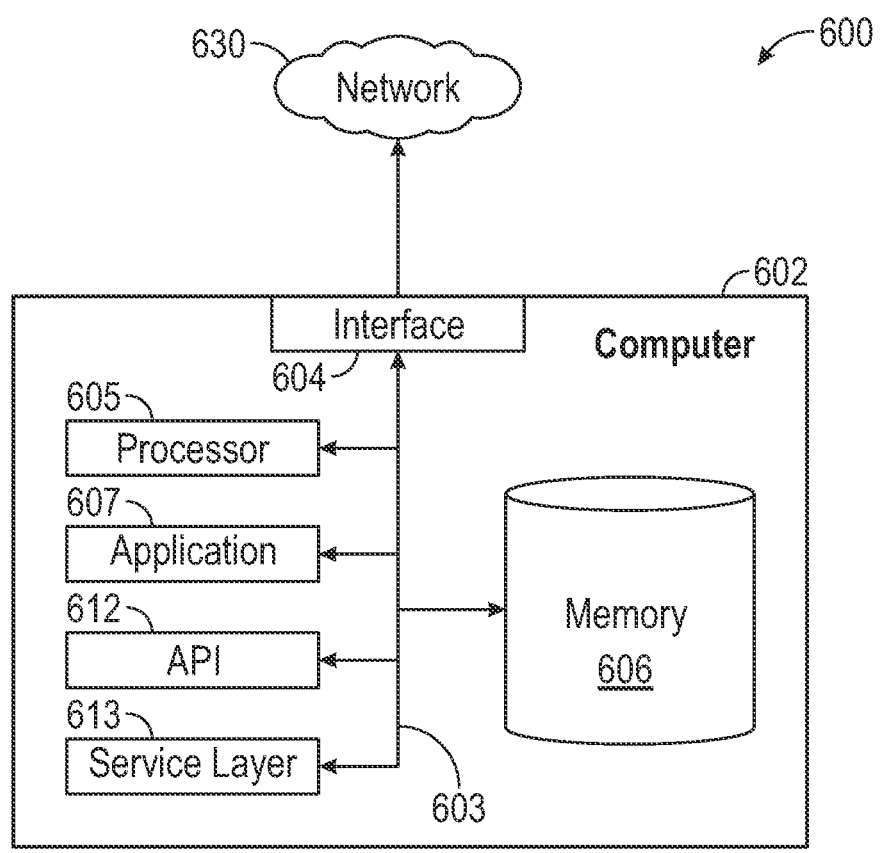
FIG. 6 shows a computer system in accordance with one or more embodiments.

Embodiments may be implemented on a computer system. FIG. 6 is a block diagram of a computer system 602 used to provide computational functionalities associated with described algorithms, methods, functions, processes, flows, and procedures as described in the instant disclosure, according to an implementation. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 602 may include a computer that includes an input device, such as a keypad, keyboard, touch screen, or other device that can accept user information, and an output device that conveys information associated with the operation of the computer 602, including digital data, visual, or audio information (or a combination of information), or a GUI.

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, business intelligence (BI) server, or other server (or a combination of servers).

The computer 602 can receive requests over network 630 from a client application (for example, executing on another computer 602) and responding to the received requests by processing the said requests in an appropriate software application. In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613. The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems in a distributed environment that are connected to the network 630. Generally, the interface 604 includes logic encoded in software or hardware (or a combination of software and hardware) and operable to communicate with the network 630. More specifically, the interface 604 may include software supporting one or more communication protocols associated with communications such that the network 630 or interface's hardware is operable to communicate physical signals within and outside of the illustrated computer 602.

The computer 602 includes at least one computer processor 605. Although illustrated as a single computer processor 605 in FIG. 6, two or more processors may be used according to particular needs, desires, or particular implementations of the computer 602. Generally, the computer processor 605 executes instructions and manipulates data to perform the operations of the computer 602 and any algorithms, methods, functions, processes, flows, and procedures as described in the instant disclosure.

The computer 602 also includes a memory 606 that holds data for the computer 602 or other components (or a combination of both) that can be connected to the network 630. For example, memory 606 can be a database storing data consistent with this disclosure. Although illustrated as a single memory 606 in FIG. 6, two or more memories may be used according to particular needs, desires, or particular implementations of the computer 602 and the described functionality. While memory 606 is illustrated as an integral component of the computer 602, in alternative implementations, memory 606 can be external to the computer 602.

The application 607 is an algorithmic software engine providing functionality according to particular needs, desires, or particular implementations of the computer 602, particularly with respect to functionality described in this disclosure. For example, application 607 can serve as one or more components, modules, applications, etc. Further, although illustrated as a single application 607, the application 607 may be implemented as multiple applications 607 on the computer 602. In addition, although illustrated as integral to the computer 602, in alternative implementations, the application 607 can be external to the computer 602.

There may be any number of computers 602 associated with, or external to, a computer system containing computer 602, each computer 602 communicating over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

While FIGS. 1-6 show various configurations of components, other configurations may be used without departing from the scope of the disclosure. For example, various components in FIG. 6 may be combined to create a single component. As another example, the functionality performed by a single component may be performed by two or more components.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A distribution system, the system comprising:
   at least one Power Management System (PMS) that controls electrical power transmitted by the distribution system;
   a first power station located at an onshore platform, comprising:
      an onshore terminal that distributes electric power to the first power station and to at least one onshore load,
      a plurality of onshore reactors that monitor inbound reactive power received from the onshore terminal or that monitor outbound reactive power sent to a remote location, and
      an onshore synchronous motor that operates on the inbound reactive power received from the onshore terminal;
   a second power station located at an offshore platform which is located at the remote location, the second power station comprising:
      an offshore terminal that receives electric power from the first power station and that delivers electric power to at least one offshore load,
      a plurality of offshore reactors that monitor inbound reactive power received from the first power station, and
      an offshore synchronous motor that operates on the inbound reactive power received from the first power station; and
   at least one submarine cable connected between the first power station and the second power station, wherein
   the at least one PMS monitors compensation reactive power in the plurality of onshore reactors, the onshore synchronous motor, the plurality of offshore reactors, and the offshore synchronous motor.

2. The system of claim 1, wherein the at least one PMS requests an excitation system of the onshore synchronous motor and the offshore synchronous motor, the plurality of onshore reactors, and the plurality of offshore reactors to respond during a change in a voltage.

3. The system of claim 1, wherein the at least one PMS requests only an excitation system of the onshore synchronous motor and the offshore synchronous motor to react against a variation of the inbound reactive power received from the onshore terminal and a variation of the inbound reactive power received from the first power station.

4. The system of claim 1, wherein
the first power station comprises four onshore reactors and
the second power station comprises two offshore reactors.

5. The system of claim 4, wherein the system further comprises
a first PMS located at the first power station and
a second PMS located at the second power station.

6. The system of claim 5,
wherein the first PMS located at the first power station controls the four onshore reactors, the onshore synchronous motor, the two offshore reactors, and the offshore synchronous motor, and
wherein the second PMS located at the second power station is a hot standby for the first PMS.

7. The system of claim 1, wherein the system further comprises two submarine cables connected between the first power station and the second power station.

8. The system of claim 1, wherein the at least one PMS monitors an electrical parameter representative of a performance of the at least one submarine cable and
adjusts a reactive compensation of one or more of the plurality of onshore reactors, the onshore synchronous motor, the plurality of offshore reactors, and the offshore synchronous motor to control the power distributed between the first power station and the second power station.

9. The system of claim 8, wherein the electrical parameter is a frequency of transmission of the power or a voltage of transmission of the power.

10. The system of claim 1, wherein the at least one PMS dynamically adjusts compensation reactive power in the plurality of onshore reactors, in the onshore synchronous motor, in the plurality of offshore reactors, and in the offshore synchronous motor to maintain a total reactive power of the distribution system at or below a predetermined threshold.

11. A method for distributing electrical power to a remote location from an onshore platform, the method comprising:
configuring at least one Power Management System (PMS) to control electrical power transmitted between a first power station and a second power station;
installing the first power station located at an onshore terminal;
distributing electric power to the first power station and to at least one onshore load;
monitoring, by the at least one PMS, inbound reactive power received from the onshore terminal to the first power station or outbound reactive power sent from the first power station to one or more remote locations;
installing the second power station at an offshore platform, the offshore platform being located at a remote location;
connecting at least one submarine cable between the first power station and the second power station;
receiving electric power from the first power station at the second power station through the at least one submarine cable;
delivering electric power from the second power station to at least one offshore load; and
monitoring, by the at least one PMS, inbound reactive power received from the first power station at the second power station, wherein
the first power station comprises:
four onshore reactors; and
an onshore synchronous motor, and
the second power station comprises:
two offshore reactors; and
an offshore synchronous motor.

12. The method of claim 11, further comprising: dynamically adjusting, by the at least one PMS, compensation reactive power in the four onshore reactors, the onshore synchronous motor, the two offshore reactors, and the offshore synchronous motor to maintain a total reactive power of the distribution system at or below a predetermined threshold.

13. The method of claim 11, further comprising: configuring two PMSs to control the electrical power distributed between the two power stations, a first PMS being located at the first power station and a second PMS being located at the second power station.

14. The method of claim 13, further comprising:
controlling, by the first PMS located at the first power station, the four onshore reactors, the onshore synchronous motor, the two offshore reactors, and the offshore synchronous motor; and
performing, by the second PMS located at the second power station, a hot standby function for the first PMS upon disconnection of the first PMS.

15. The method of claim 11, further comprising: connecting two submarine cables between the first power station and the second power station.

16. The method of claim 12, further comprising:
monitoring, by the at least one PMS, an electrical parameter representative of a performance of the at least one submarine cable; and
adjusting, by the at least one PMS, a reactive compensation of one or more of at least two onshore reactors, of the onshore synchronous motor, of at least two offshore reactors, and of the offshore synchronous motor to control the power distributed between the first power station and the second power station connecting two submarine cables between the first power station and the second power station.

17. The method of claim 16, wherein the electrical parameter is a frequency of transmission of the power or a voltage of transmission of the power.

* * * * *